United States Patent
Choi et al.

(10) Patent No.: US 9,042,124 B1
(45) Date of Patent: May 26, 2015

(54) CIRCUITS AND METHODS FOR DETERMINING PEAK CURRENT

(75) Inventors: Jinho Choi, Saratoga, CA (US); Hao Peng, Sunnyvale, CA (US); Wanfeng Zhang, Palo Alto, CA (US); Tuyen Doan, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 279 days.

(21) Appl. No.: 13/439,097

(22) Filed: Apr. 4, 2012

Related U.S. Application Data

(60) Provisional application No. 61/472,578, filed on Apr. 6, 2011.

(51) Int. Cl.
*H02M 3/335* (2006.01)

(52) U.S. Cl.
CPC ...... *H02M 3/33507* (2013.01); *H02M 3/33523* (2013.01)

(58) Field of Classification Search
USPC ............ 363/21.01–21.18, 97, 15, 16, 131, 20
See application file for complete search history.

(56) References Cited

U.S. PATENT DOCUMENTS

| | | | |
|---|---|---|---|
| 8,199,539 B2 * | 6/2012 | Wang et al. | 363/21.18 |
| 8,576,588 B2 * | 11/2013 | Kuang et al. | 363/21.16 |

* cited by examiner

*Primary Examiner* — Gary L Laxton
*Assistant Examiner* — Afework Demisse

(57) ABSTRACT

Embodiments include circuits and methods to determine peak current for current regulation. A control signal circuit monitors a current on the primary side of a transformer based a turn on time of a switch coupled to the primary side. The control signal circuit determines whether the monitored current exceeds an over-current protection threshold, and determines a duration that the monitored current exceeds the over-current protection threshold. The control signal circuit determines a peak primary current in the primary side based on the over-current protection threshold, the duration that the monitored current exceeds the over-current protection threshold, and the turn on time of the switch. The control signal circuit controls the turn on time for the switch based on the determined peak primary current.

17 Claims, 8 Drawing Sheets

US 9,042,124 B1

CIRCUITS AND METHODS FOR DETERMINING PEAK CURRENT

CROSS REFERENCE TO RELATED APPLICATIONS

This application claims the benefit of U.S. Provisional App. No. 61/472,578 for "Peak Current Estimator Method for OCP Control Regulation" filed Apr. 6, 2011, the disclosure of which is incorporated herein by reference.

This application is related to U.S. Provisional App. No. 61/389,655 for "Average Output Current Estimation for Flyback Converter Using Primary-side Sensing" filed Oct. 4, 2010, and U.S. patent application Ser. No. 13/246,515 for "Average Output Current Estimation Using Primary-Side Sensing" filed Sep. 27, 2011, the disclosure of both are incorporated herein by reference.

BACKGROUND

Particular embodiments generally relate to determining peak current.

Unless otherwise indicated herein, the approaches described in this section are not prior art to the claims in this application and are not admitted to be prior art by inclusion in this section.

The use of electronic devices is popular in stationary and mobile environments. One kind of visual display is typically used in both environments. For example, the same kind of visual display is used in electronic devices from large sign/advertising boards to cellular phones or portable game players. Energy consumption is a concern in the design of the electronic devices. For example, in the marketplace, an electronic device that uses less energy may take significant precedence over other devices.

Light-emitting diodes (LEDs) are being used in displays because of the LEDs' energy efficiency, reliability, low maintenance, and environmental friendliness. LEDs have been used in various devices, such as signal devices (e.g. traffic lights, exit signs, and signboards) as well as in some illumination devices, such as flashlights. Additionally, LEDs may be used in light sources for general illumination in homes to commercial applications. LEDs have many advantages, such as long life, energy savings, better quality light output, safety, size, and durability.

A single-stage flyback solution for driving LEDs is used because of the flyback solution's simplicity and lower cost. The single-stage flyback solution uses sinusoidal input current. Conventional current regulation creates large tolerances of the regulated current.

SUMMARY

Embodiments include circuits and methods for determining peak current. A circuit comprises a transformer, a load, a switch and a control signal circuit. The transformer has a primary side and a secondary side. The primary side is coupled to receive an input voltage. The load is coupled to the secondary side. The switch is coupled to the primary side. The control signal circuit is coupled to the switch. The control signal circuit is configured to monitor a current on the primary side of the transformer based on an on time of the switch. The control signal circuit is further configured to determine a duration that the monitored current exceeds a threshold. The control signal circuit is further configured to determine a peak primary current in the primary side based on the threshold, the duration that the monitored current exceeds the threshold, and the on time of the switch.

In some embodiments, the threshold is a voltage corresponding to a value of the current on the primary side of the transformer.

In some embodiments, the peak primary current is determined by multiplying an over-current protection threshold corresponding to the threshold and a first ratio, wherein the first ratio is the on time of the switch divided by the on time of the switch minus the duration.

In some embodiments, the circuit further comprises a low pass filter. The duration comprises a time delay from a low pass filter.

In some embodiments, a circuit comprises a sense circuit, a comparator, and a driver. The sense circuit senses a current in a primary stage of a transformer. The comparator has a first input to receive a first signal corresponding to the current and a second input to receive a second signal corresponding to a maximum current. The driver receives a first signal and generates a second signal for turning a MOSFET on and off. The sense circuit is coupled to a terminal of the MOSFET to sense the current when the MOSFET is on. The comparator generates a pulse when the current exceeds the maximum current. A peak primary current is determined from the maximum current, a period of time the MOSFET is turned on, and a length of time of the pulse.

In some embodiments, the circuit further comprises an estimator circuit, an accumulator, and a controller. The estimator circuit receives the pulse from the comparator and determines the peak primary current and an average secondary current. The accumulator determines a difference between the average secondary current and a reference current to produce an error signal. The controller receives the error signal and produces the first signal.

The first signal is turned off when the pulse is generated.

In some embodiments, the sense circuit is coupled to a resistor.

In some embodiments, the sense circuit comprises an amplifier.

In some embodiments, the peak primary current is determined by multiplying the maximum current and a first ratio. The first ratio is the period of time the MOSFET is turned on divided by the period of time the MOSFET is turned on minus said length of time of the pulse.

In some embodiments, the sense circuit comprises a low pass filter.

In some embodiments, the peak primary current is determined by multiplying the maximum current and a first ratio. The first ratio is the period of time the MOSFET is turned on divided by the period of time the MOSFET is turned on minus a first time period. The first time period is said length of time of the pulse plus a time delay of the low pass filter.

In some embodiments, the circuit further comprises one or more second comparators. Each comparator has a first input to receive the first signal corresponding to the current and a second input to receive different signals corresponding to different maximum currents. An output of one of the comparators is selected to set a secondary current in the transformer.

In some embodiments, a method comprises monitoring a current on a primary side of a transformer based on an on time of a switch coupled to the primary side; determining a duration that the monitored current exceeds a threshold; and determining a peak primary current in the primary side based on the threshold, the duration that the monitored current exceeds the threshold, and the on time of the switch.

In some embodiments, the threshold is a voltage corresponding to a value of the current on the primary side of the transformer.

In some embodiments, determining the peak primary current comprises multiplying an over-current protection threshold corresponding to the threshold and a first ratio. The first ratio is the on time of the switch divided by the on time of the switch minus said duration.

In some embodiments, the duration comprises a time delay from a low pass filter.

In some embodiments, the method further comprises outputting a signal generated based on the determined peak primary current to control the on time of the switch in a control loop.

In some embodiments, the method further comprises generating an average current based on the peak primary current.

In some embodiments, the method further comprises comparing the average current with a reference current to determine an error signal.

In some embodiments, the method further comprises altering the on time of the switch based on the error signal.

The following detailed description and accompanying drawings provide a better understanding of the nature and advantages of the embodiments described herein.

DETAILED DESCRIPTION

Described herein are techniques for determining peak current. In the following description, for purposes of explanation, numerous examples and specific details are set forth in order to provide a thorough understanding of the disclosure. It will be evident, however, to one skilled in the art that the present invention as defined by the claims may include some or all of the features in these examples alone or in combination with other features described below, and may further include modifications and equivalents of the features and concepts described herein.

Figure 1:
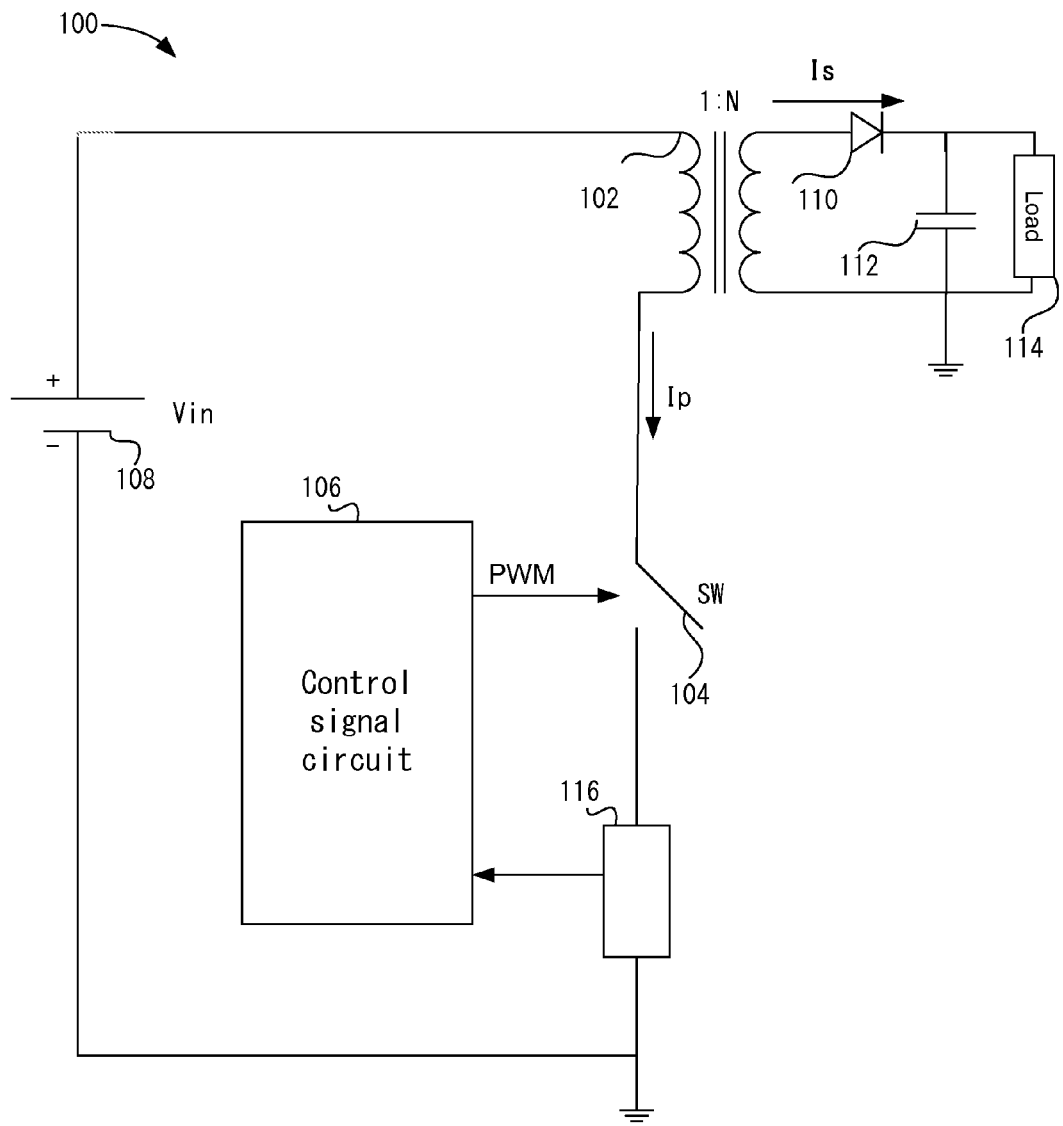
FIG. 1 illustrates a circuit for determining peak current according to one embodiment.

FIG. 1 illustrates a circuit 100 for determining peak current according to one embodiment. Circuit 100 includes a transformer 102, a switch 104, a control signal circuit 106, an input voltage (Vin) 108, a diode 110, a capacitor 112, a load 114, and a current sense circuit 116. A particular embodiment is described in the context of a single-stage flyback solution; however, other embodiments may be implemented in other power supply configurations. The primary current Ip is the current through the primary side of transformer 102. The secondary current Is is the current through the secondary side of transformer 102. In this example, a primary current (Ip) is detected on a primary side of transformer 102 and may be used to estimate both a peak current on the primary side and/or a peak current on a secondary side of transformer 102.

When switch 104 is on, a closed loop circuit is established with the primary side of transformer 102 and input voltage 108. In the present disclosure, the term "on" refers to the switch being closed such that the input and output of the switch are a short circuit. Similarly, the term "off" refers to the switch being open such that the input and output of the switch are an open circuit. When switch 104 is on, a voltage across a secondary winding of transformer 102 is negative such that diode 110 is reverse-biased (e.g., blocked). During this time period, capacitor 112 supplies energy to load 114. In one embodiment, load 114 is a LED/LED string that is being driven by circuit 100, but other loads may be used. When switch 104 is off, the energy stored in the primary winding of transformer 102 is transferred to the secondary winding. The energy is then transferred to load 114 in the form of a secondary current Is through forward biased diode 110.

Particular embodiments monitor the primary current Ip on the primary side of transformer 102 and estimate a peak primary current Ipk of the primary current Ip. The peak primary current Ipk may be used to estimate the peak current and the average current of the secondary current Is through the secondary side of transformer 102. For example, the estimated peak primary current Ipk may be used for the peak current and average current estimation described in U.S. patent application Ser. No. 13/246,515 for "Average Output Current Estimation Using Primary-Side Sensing" filed Sep. 27, 2011, which is hereby incorporated herein by reference. The determination of peak primary current Ipk is used to adjust a control signal that is used to control switch 104. For example, control signal circuit 106 is used to output the control signal that turns switch 104 on and off based on monitored current. The primary current Ip is monitored using current sense circuit 116, which may include a sense resistor, for example. The amount of time switch 104 is on may be varied based on the estimated peak primary current Ipk. The control signal circuit 106 may use over-current protection to control the peak primary current Ipk. As described in more detail below, control signal circuit 106 sets a reference voltage to set an over-current protection (OCP) current Iocp, which corresponds to a maximum primary current Ip. An internal control signal in control signal circuit 106 may cause switch 104 to turn off when the primary current Ip reaches the OCP current Iocp. However, the primary current Ip may rise above the OCP current Iocp before switch 104 is fully turned off. Therefore, control signal circuit 106 determines the peak primary current Ipk based on time delays.

Figure 2:
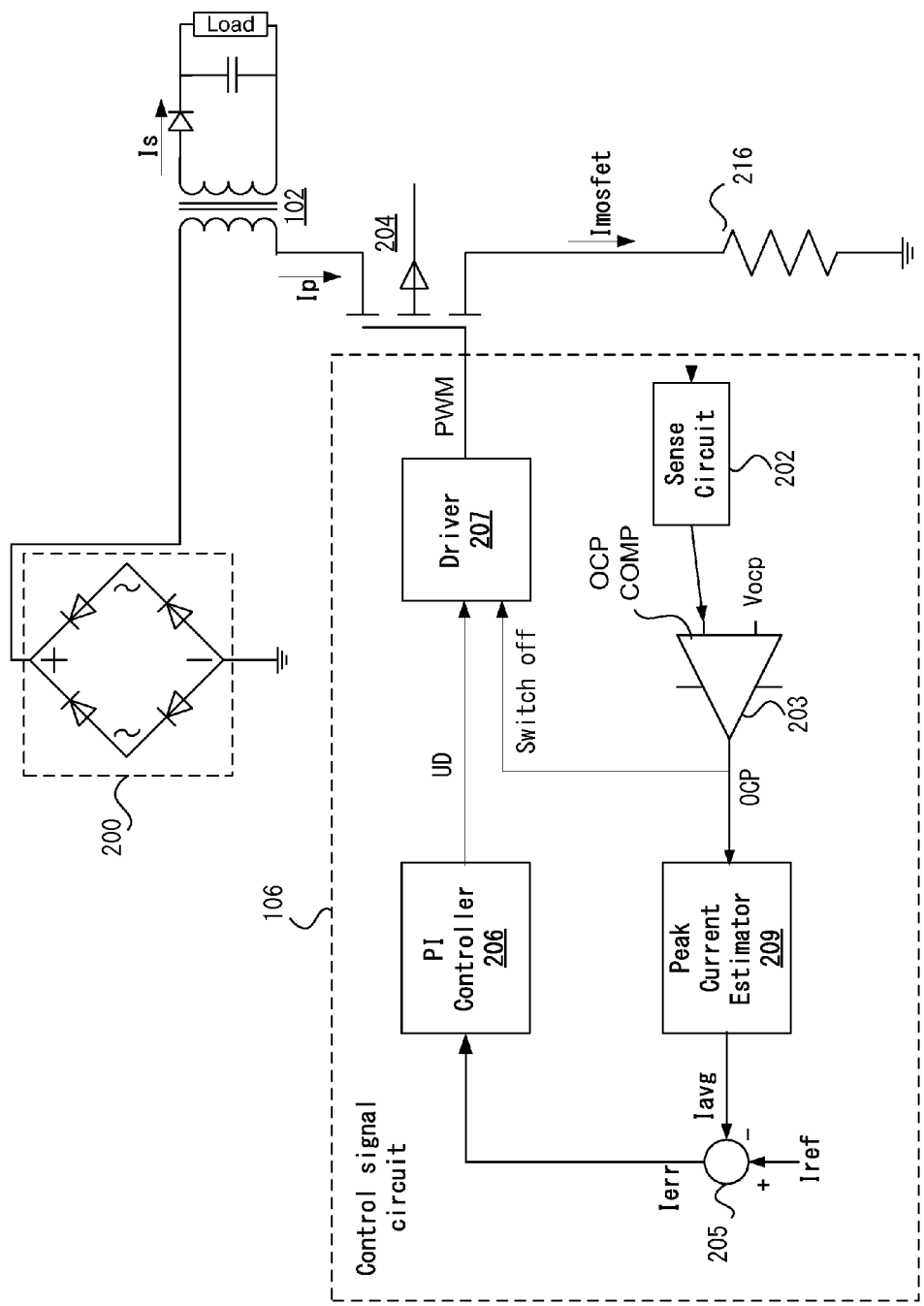
FIG. 2 illustrates another circuit for determining peak current according to one embodiment.

FIG. 2 depicts a more detailed example of control signal circuit 106 according to one embodiment. An input circuit 200 provides the input signal that is a half wave rectified AC signal. The input signal is input into the primary side of transformer 102.

Control signal circuit 106 includes sense circuit 202 that sense a voltage generated by current Imosfet into resistor 216. Current Imosfet is the primary current Ip through MOSFET 204. As will now be described, certain embodiments turn off MOSFET 204 when current Imosfet exceeds a predetermined threshold. The peak current Ipk can be calculated from internal delays in the shut down process. In some embodiments, sense circuit 202 may include a low pass filter that receives a voltage corresponding to current Imosfet and outputs a filtered signal corresponding to current Imosfet to sense circuit 202. Sense circuit may include an amplifier, for example. Sense circuit 202 senses current Imosfet and outputs a sense signal to an OCP comparator 203 (OCP COMP). Comparator 203 compares a voltage corresponding to Imosfet to a over-current protection reference voltage Vocp and outputs an over-current protection output signal (OCP). The reference voltage Vocp corresponds to a particular level of current Imosfet that is near a maximum desired level of current Imosfet. The reference voltage Vocp may be selected based on the current characteristics of load 114, for example. In some embodiments, Vocp is selected to avoid LED spike currents. The output of comparator 203 is high when the voltage corresponding to current Imosfet is greater than the over-current protection reference voltage Vocp. In some embodiments, the reference voltage Vocp is programmable.

Comparator 203 OCP is received by a peak current estimator 209. Peak current estimator 209 determines a peak current Ipk for use in a control loop. Determination of Ipk is described in more detail below. Peak current estimator 209 determines Ipk and uses the determined value of Ipk to generate an average value, Iave, of the secondary current, Is, in transformer 102. Peak current estimator 209 may determine the average secondary current in a manner as described in U.S. patent application Ser. No. 13/246,515 for "Average Output Current Estimation Using Primary-Side Sensing" filed Sep. 27, 2011 mentioned above. Peak current estimator 209 outputs Iave, which is compared to a reference current value, Iref, to produce an error signal, Ierr. Iave may be compared to Iref in an accumulator 205, for example. Error signal Ierr is input into a proportional-integral (PI) controller 206. PI controller 206 calculates a duty cycle as a function of the error signal Ierr. PI controller 206 outputs UD signal. The UD signal, in turn, is coupled to an input of driver 207. Driver 207 may amplify the UD signal to create a PWM signal that is used to drive the gate of MOSFET 204. Thus, the UD signal controls the amount of time MOSFET 204 is on and off. PI controller 206 may alter the duty cycle of the UD and PWM signals based on error signal Ierr, which adjusts both the primary side current Ip and secondary current Is, to thereby reduce the error signal Ierr.

OCP signal from OCP COMP 203 is also coupled to driver 207. In this example, the OCP signal, which is triggered by Imosfet increasing above a predetermined level set by Vocp, acts to turn off the UD signal inside driver 207. Turning off the UD signal, in turn, turns off the PWM signal and thereby turns off MOSFET 204. The peak current can be calculated from the period of the UD signal, Ton, and internal delays as will now be illustrated.

Figure 3:
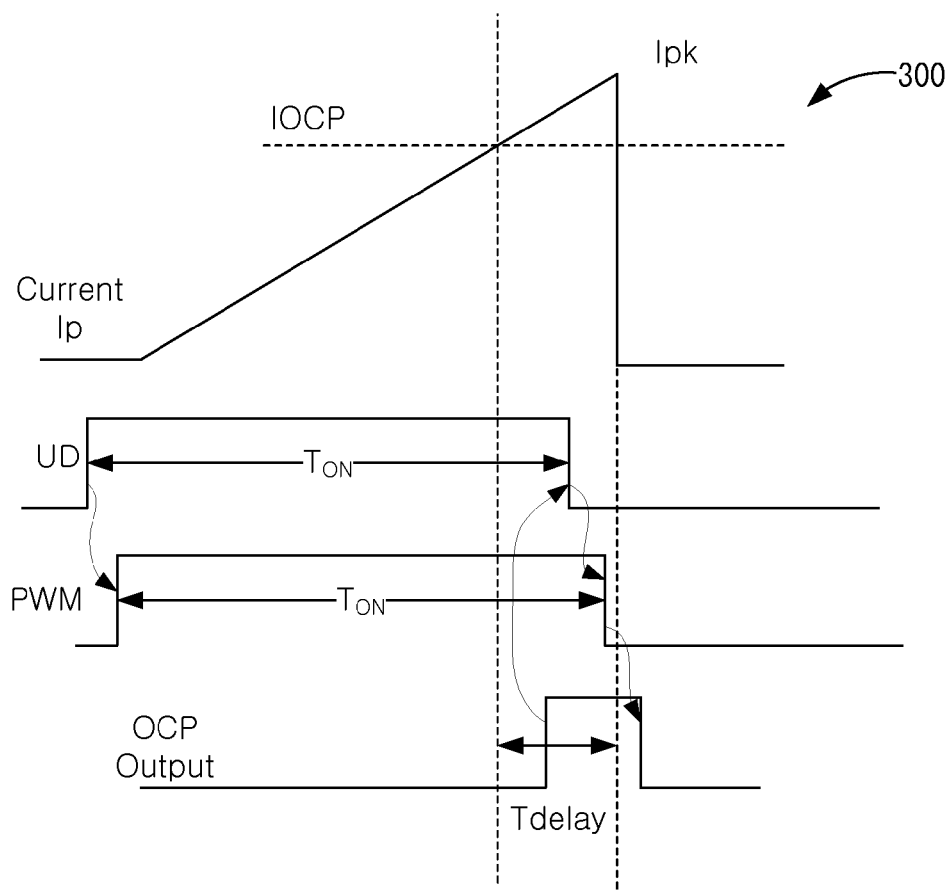
FIG. 3 illustrates a graph showing the relationship between the primary current and control signals according to one embodiment.

FIG. 3 illustrates a graph 300 showing a relationship between the primary current Ip and control signals from control signal circuit 106 according to one embodiment. First, UD signal transitions from low to high, which causes PWM signal to transition from low to high. PWM signal is a delayed version of the UD signal and may have different voltage and current characteristics. When PWM signal is high, MOSFET 204 turns on and current Ip increases. When current Ip increases above an over-current level, Iocp, set by Vocp in the circuit of FIG. 2, OCP COMP 203 generates OCP output signal. There is a delay between the point in time where Ip exceeds Iocp and the point in time where the OCP output signal transitions from low to high. The OCP output signal, in turn, turns off the UD signal, which turns off the PWM signal, which turns off MOSFET 204. When MOSFET 204 turns off, the current Imosfet drops and the OCP COMP 203 resets. As illustrated in FIG. 3, there is a delay, Tdelay, between the point in time where current Ip increases above Iocp and the point in time where the peak current Ipk is reached (at the moment where MOSFET 204 is shut down).

Figure 4:
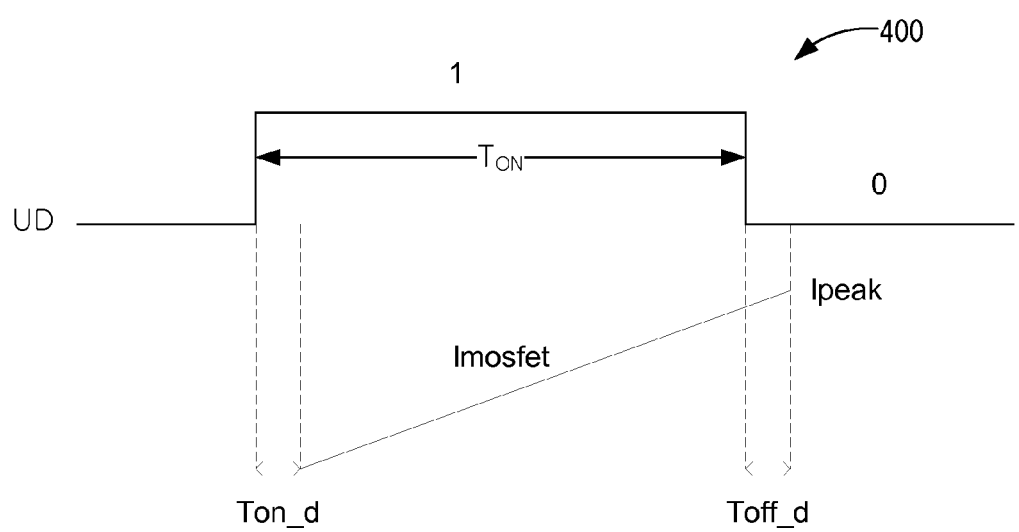
FIG. 4 illustrates a graph showing the relationship between the UD signal and current according to one embodiment.

FIG. 4 shows the relationship between the UD signal and the current Imosfet. As mentioned above, there is a turn on delay, Ton_d, between when the UD signal goes high and when current Imosfet begins to increase. The turn on delay may depend on the input voltage on the transformer 102, the output voltage of MOSFET 204, the strength of the driver 207 in control signal circuit 106, and the characteristics of MOSFET 204. There is a turn off delay, Toff_d, between when the UD signal goes low and when current Imosfet begins to decrease. Similarly, the turn off delay may depend on the above described factors for turn on delay as well as the current in the transformer when MOSFET 204 is turned off. In one embodiment, the turn on delay and the turn off delay of switch 104 are approximately equal. Accordingly, the on time of UD control signal, Ton, is approximately equal to the on time of MOSFET 204.

FIG. 4 illustrates a graph showing the relationship between delays of a control signal and the primary current Ip according to one embodiment. A first delay time Tdelay1 is the delay from the primary current Ip reaching the OCP current Iocp to the detection by OCP COMP 203 (see FIG. 2). The time Tpulse is the pulsewidth of the OCP output signal caused by the primary current Ip increasing above Iocp and decreasing below Iocp, including circuit delays. The second delay time Tdelay2 is the delay from the switching off of OCP COMP 203 as it transitions from high to low. The following equations may be used to determine the peak primary current Ipk:

$$T_{delay1} = T_{LPF} + T_{comp0to1} \quad (1)$$

$$T_{delay2} \approx T_{comp1to0} \quad (2)$$

$$\text{Total delay: } T_{delay} = T_{delay1} + T_{pulse} - T_{delay2} \quad (3)$$

$$T_{delay} \approx T_{LPF} + T_{pulse} \quad (4)$$

Figure 5:
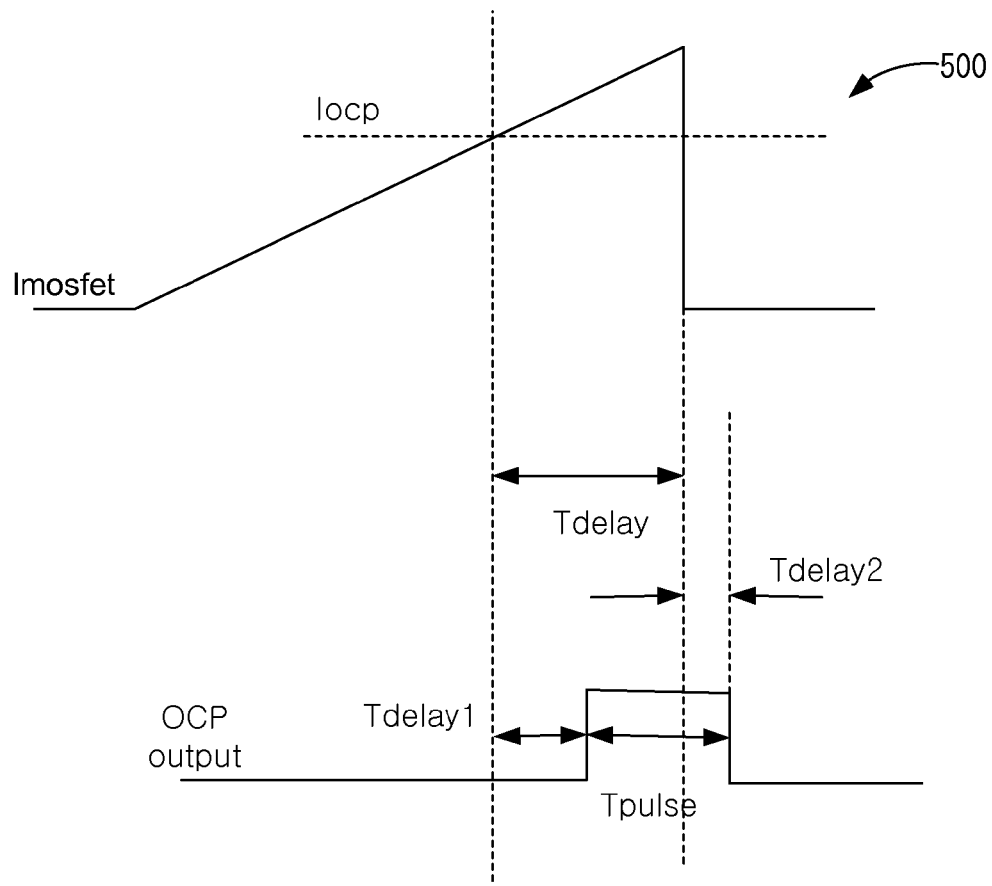
FIG. 5 illustrates a graph showing the time delays according to one embodiment.

Referring to FIGS. 4 and 5:

$$I_{pk} = \frac{T_{ON}}{T_{ON} - T_{delay}} \times I_{OCP} \quad (5)$$

In equation 1, the term $T_{LPF}$ is the delay through components (such as a low pass filter or amplifier) between MOSFET 204 and OCP COMP 203, and the term $T_{comp0to1}$ is the transition time of OCP COMP 203 from a low output to a high output.

In equation 2, the term $T_{comp1to0}$ is the transition time of OCP COMP 203 from a high output to a low output.

In equation 3, the term $T_{pulse}$ is the pulsewidth of the OCP signal in control signal circuit 106.

As can be seen in equation 4, equation 3 is simplified using the assumption that the delay times $T_{comp0to1}$ and $T_{comp1to0}$ are approximately equal.

In equation (5), the term Iocp is the OCP current Iocp corresponding to Vocp in control signal circuit 106. The term Ton is the period of time MOSFET 204 is on.

Accordingly, the above approach may be used to determine the peak primary side current, which may be used to determine the peak secondary current.

Figure 6:
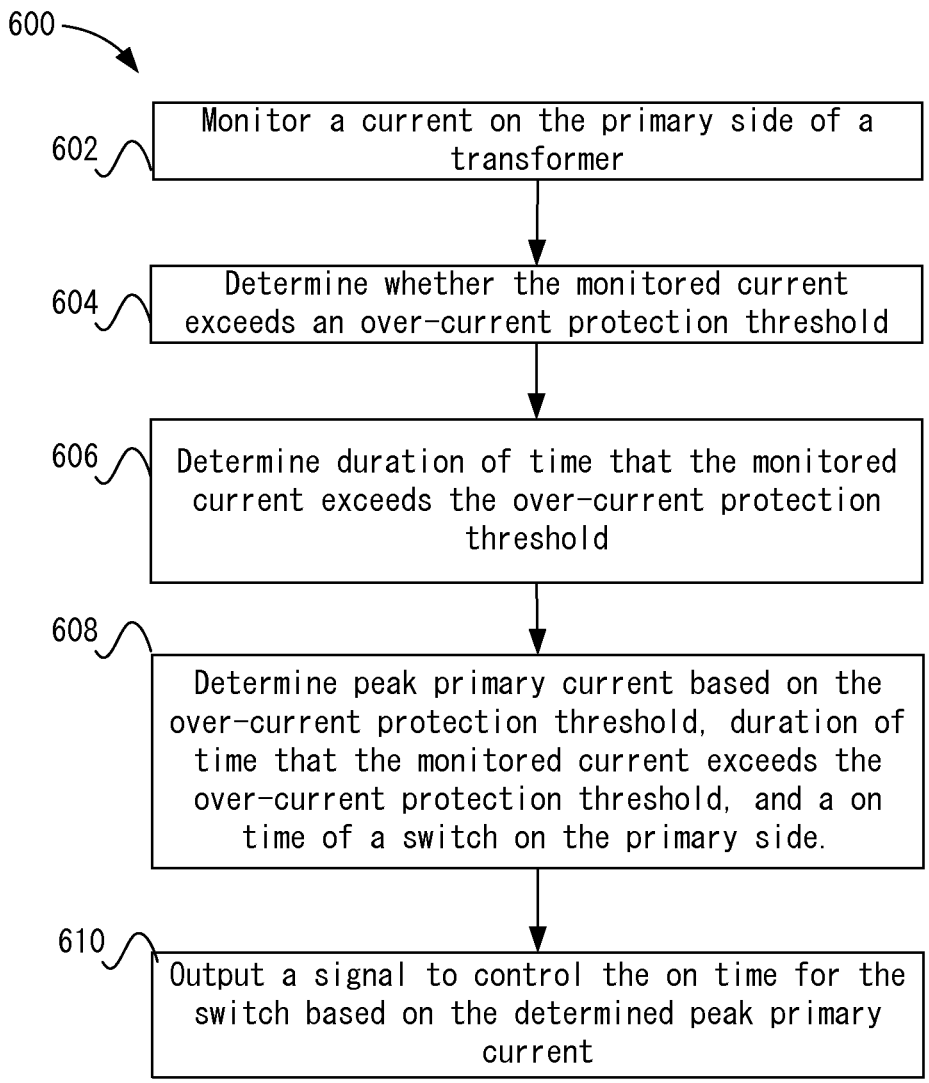
FIG. 6 illustrates a simplified flowchart of a method for determining a peak primary current according to one embodiment.

FIG. 6 depicts a simplified flowchart 600 of a method for determining a peak primary current Ipk according to one embodiment. At 602, primary current Ip on the primary side of a transformer is monitored. The monitoring may be based on an on time, Ton, of a switch coupled to the primary side of a transformer. At 604, a determination is made of whether the monitored current exceeds an over-current protection threshold (e.g., OCP current Iocp). At 606, a duration that the monitored current exceeds the over-current protection threshold is determined. For example, the duration may be determined as the time from the determination that the monitored current exceeds the over-current protection threshold to the time that the monitored current falls below the over-current protection threshold. At 608, a peak primary current is determined based on the over-current protection threshold (e.g., Iocp/Vocp), the duration that the monitored current exceeds the over-current protection threshold, and the on time, Ton, of the switch. At 610, a control signal is provided (e.g., by a controller) to control the on time, Ton, for the switch based on the determined peak primary current Ipk. For example, the peak primary current Ipk may be used to generated an average secondary current, which is used to control Ton. The control signal may be adjusted based on an average secondary current calculated from the peak primary current Ipk.

Figure 7:
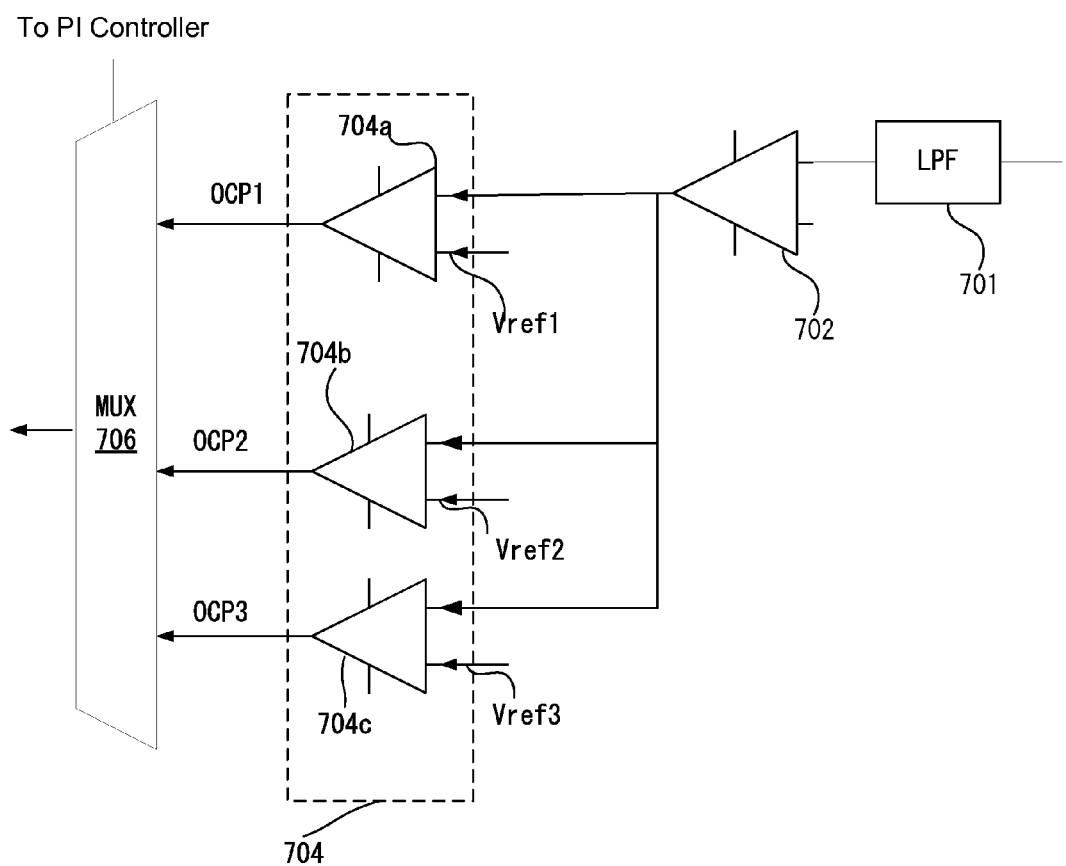
FIG. 7 illustrates a more detailed example of the control signal circuit according to another embodiment.

FIG. 7 depicts another embodiment of control signal circuit 106 that may be used to set different secondary currents into a load. For simplicity and clarity, only a portion of control signal circuit 106 is shown.

In some implementations, control signal circuit 106 may include two or more comparators 704. In this example, three comparators 704a, 704b, 704c are used. Comparators 704a, 704b, 704c receive reference voltages Vrefa, Vrefb, Vrefc, respectively. For example, reference voltages Vrefa, Vrefb, Vrefc may be 0.25 Volts, 0.4 Volts, and 0.6 Volts, respectively. A voltage corresponding to current Imosfet is sensed through a low pass filter (LPF) 701 and amplified by amplifier 702. Amplifier 702 outputs an amplified signal to comparators 704a, 704b, 704c. Comparators 704a, 704b, 704c compare the amplified signal corresponding to current Imosfet to reference voltages Vrefa, Vrefb, Vrefc respectively, and output OCP1 output signal, OCP2 output signal, and OCP3 output signal, respectively, to multiplexer (MUX) 706. MUX 706 outputs one of the output signals based on a selection input controlled by PI controller (not shown).

Figure 8:
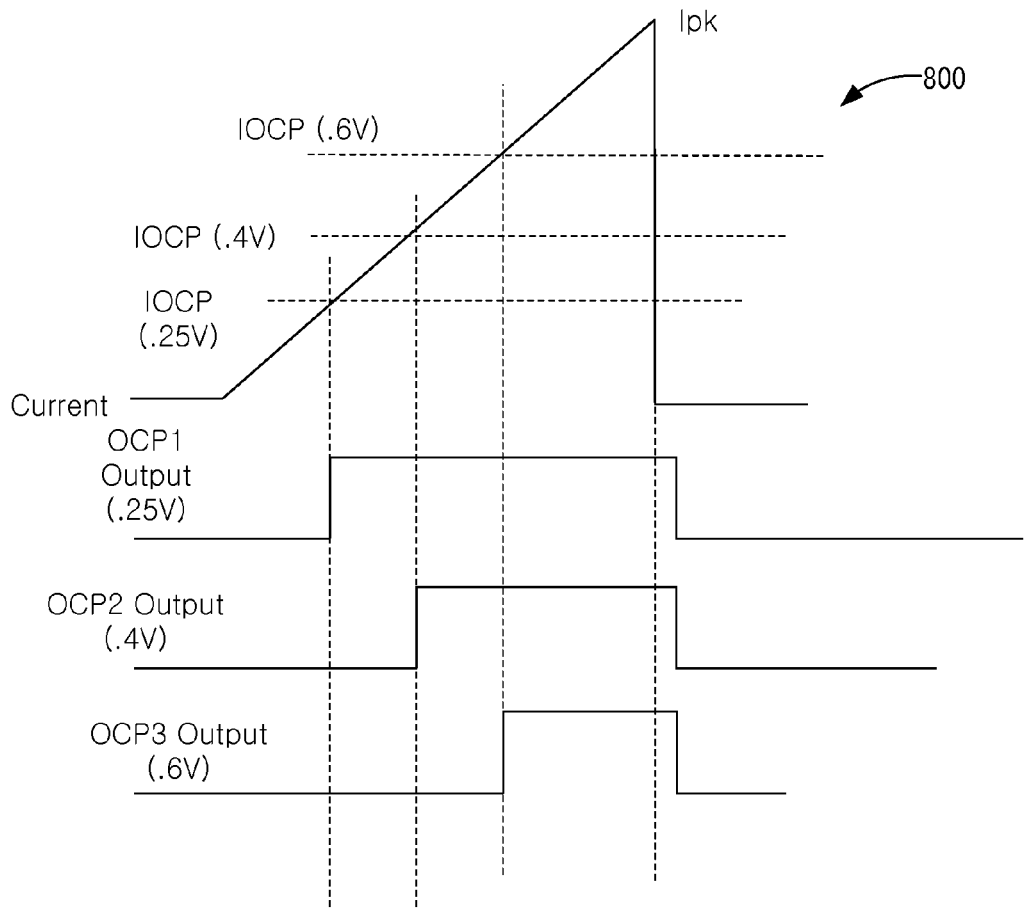
FIG. 8 illustrates a graph showing the relationship between the primary current and over-current protection detection signals according to another embodiment.

FIG. 8 illustrates a graph 800 showing the relationship between the primary current Ip and over-current protection detection signals according to one embodiment. The present example illustrates how different peak primary currents may be used to control a secondary current into a load.

If OCP3 output signal is high during on time of switch 104, an over-current protection current Iocp corresponding to reference voltage Vrefc (e.g., 0.6V) is used for the peak primary current Ipk calculation. However, if, during the on time of switch 104, OCP2 output signal is high and OCP3 output signal is not high, an over-current protection current Iocp corresponding to the reference voltage Vrefb (e.g., 0.4V) is used for the peak primary current Ipk calculation.

If during the on time of switch 104, an OCP1 output signal is high and both OCP2 output signal and OCP3 output signal are not high during on time of switch 104, an over-current protection current Iocp corresponding to the reference voltage Vrefa (e.g., 0.25V) is used for the peak primary current Ipk calculation.

If OCP1 output signal, OCP2 output signal, and OCP3 output signal are not high during turn on time of switch 104, an over-current protection current Iocp corresponding to one half of 0.25V is used for the peak primary current Ipk current calculation.

Particular embodiments provide many advantages. For example, the determination of peak primary current may be used to adjust the current through the transformer. For example, the determination of the peak secondary current may be accurate enough for proper operation of the LED/LED string.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, one or more steps of methods or processes discussed above may be performed in a different order (or concurrently) and still achieve desirable results. Based on the above disclosure and the following claims, other arrangements, embodiments, implementations and equivalents may be employed without departing from the scope of the invention as defined by the claims.

What is claimed is:

1. A method comprising: monitoring a current on a primary side of a transformer based on an on time of a switch coupled to the primary side; determining a first threshold, a duration that the monitored current exceeds the first threshold, and the on time of the switch; and determining a peak primary current in the primary side by multiplying a second threshold, the second threshold being an over-current protection threshold corresponding to the first threshold, and a first ratio, the first ratio being the on time of the switch divided by the on time of the switch minus said duration.

2. The method of claim 1, wherein the first threshold is a voltage corresponding to a value of the current on the primary side of the transformer.

3. The method of claim 1, wherein said duration comprises a time delay from a low pass filter.

4. The method of claim 1, further comprising outputting a signal generated based on the determined peak primary current to control the on time of the switch in a control loop.

5. The method of claim 4, further comprising generating an average current based on the peak primary current.

6. The method of claim 5, further comprising comparing the average current with a reference current to determine an error signal.

7. The method of claim 6, further comprising altering the on time of the switch based on the error signal.

8. A circuit comprising: a transformer having a primary side and a secondary side, the primary side coupled to receive an input voltage; a load coupled to the secondary side; a switch coupled to the primary side; and a control signal circuit coupled to the switch, the control signal circuit configured to: monitor a current on the primary side of the transformer based on an on time of the switch; determining a first threshold, a duration that the monitored current exceeds the first threshold, and the on time of the switch; and determining a peak primary current in the primary side by multiplying a second threshold, the second threshold being an over-current protection threshold corresponding to the first threshold, and a first ratio, the first ratio being the on time of the switch divided by the on time of the switch minus said duration.

9. The circuit of claim 8, wherein the first threshold is a voltage corresponding to a value of the current on the primary side of the transformer.

10. The circuit of claim 8, further comprising a low pass filter, wherein said duration comprises a time delay from a low pass filter.

11. A circuit comprising:
a sense circuit to sense a first current in a primary stage of a transformer, the sense circuit being coupled to a terminal of a Metal Oxide Semiconductor Field Effect Transistor (MOSFET) to sense the first current when the MOSFET is on;
a first comparator having a first input to receive a first signal corresponding to the first current and a second input to receive a second signal corresponding to a second, maximum current, the first comparator generating a pulse when the first current exceeds the second, maximum current; and
a driver to receive a first signal and generate a second signal for turning the MOSFET on and off, a third, peak primary current being determined by multiplying the second, maximum current and a first ratio, wherein the first ratio is a period of time the MOSFET is turned on divided by the period of time the MOSFET is turned on minus a first time period.

12. The circuit of claim 11, further comprising: an estimator circuit to receive the pulse from the first comparator and determine the third, peak primary current and a fourth, average secondary current; an accumulator to determine a difference between the fourth, average secondary current and a fifth, reference current to produce an error signal; and a controller to receive the error signal and produce the first signal, wherein the first signal is turned off when the pulse is generated.

13. The circuit of claim 11, wherein the sense circuit is coupled to a resistor.

14. The circuit of claim 11, wherein the sense circuit comprises an amplifier.

15. The circuit of claim 11, wherein the sense circuit comprises a low pass filter.

16. The circuit of claim 15, wherein the first time period is a length of time of the pulse plus a time delay of the low pass filter.

17. The circuit of claim 11, further comprising one or more second comparators, each second comparator having a first input to receive the first signal corresponding to the first current and a second input to receive different signals corresponding to different second, maximum currents, wherein an output of said first comparator or said one or more second comparators is selected to set a fourth, secondary current in the transformer.

* * * * *